United States Patent
Chen et al.

(10) Patent No.: US 7,471,621 B2
(45) Date of Patent: Dec. 30, 2008

(54) METHOD AND APPARATUS FOR DYNAMIC ADJUSTMENT OF ORTHOGONAL FREQUENCY-DIVISION MULTIPLEXING DURING CONGESTED CONDITIONS

(75) Inventors: David T. Chen, Palatine, IL (US); Kadathur S. Natarajan, Wilmette, IL (US); Ivan N. Vukovic, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 532 days.

(21) Appl. No.: 11/399,630

(22) Filed: Apr. 6, 2006

(65) Prior Publication Data
US 2007/0237075 A1    Oct. 11, 2007

(51) Int. Cl.
*H04J 11/00* (2006.01)

(52) U.S. Cl. .................. 370/208; 370/210; 370/329; 455/452.1

(58) Field of Classification Search ........................ None
See application file for complete search history.

(56) References Cited

U.S. PATENT DOCUMENTS

| | | | |
|---|---|---|---|
| 6,334,057 B1 | 12/2001 | Malmgren et al. | |
| 6,587,668 B1 | 7/2003 | Miller et al. | |
| 6,937,558 B2 * | 8/2005 | Wakutsu | 370/208 |
| 2003/0026215 A1 | 2/2003 | Schafer | |
| 2005/0130665 A1 | 6/2005 | Laroia et al. | |
| 2005/0254442 A1 | 11/2005 | Proctor, Jr. et al. | |
| 2006/0056451 A1 * | 3/2006 | Yano et al. | 370/468 |
| 2007/0230414 A1 * | 10/2007 | Afrashteh et al. | 370/338 |
| 2008/0137562 A1 * | 6/2008 | Li et al. | 370/280 |

* cited by examiner

*Primary Examiner*—Bob A Phunkulh

(57) ABSTRACT

A base station has a transmission element to wirelessly transmit at least one data frame. The at least one data frame has a predetermined uplink allocation and a predetermined downlink allocation. A detection element detects a congestion condition. When the congestion condition is detected, the transmission element transmits a request to at least one neighboring base station for an expansion of the predetermined uplink allocation or the predetermined downlink allocation. A reception element receives a signal from the at least one neighboring base station. A processing element expand the one of the predetermined uplink allocation or the predetermined downlink allocation by a specified amount in response to the signal indicating the specified amount for a mutually agreed time, or number of symbols or frames.

19 Claims, 6 Drawing Sheets

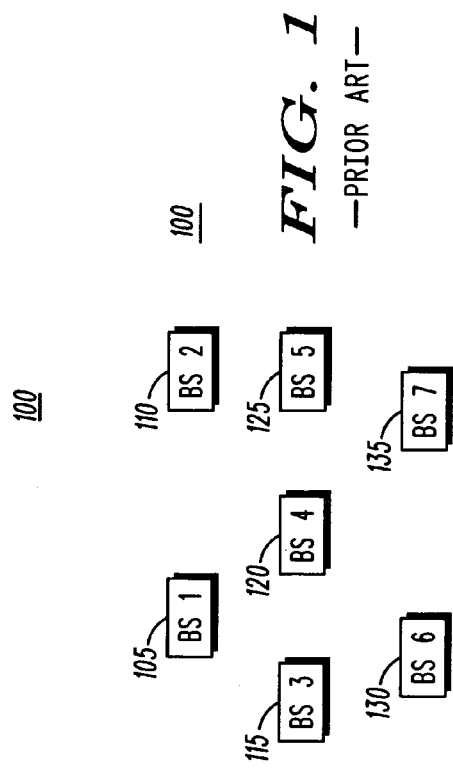
FIG. 1 —PRIOR ART—
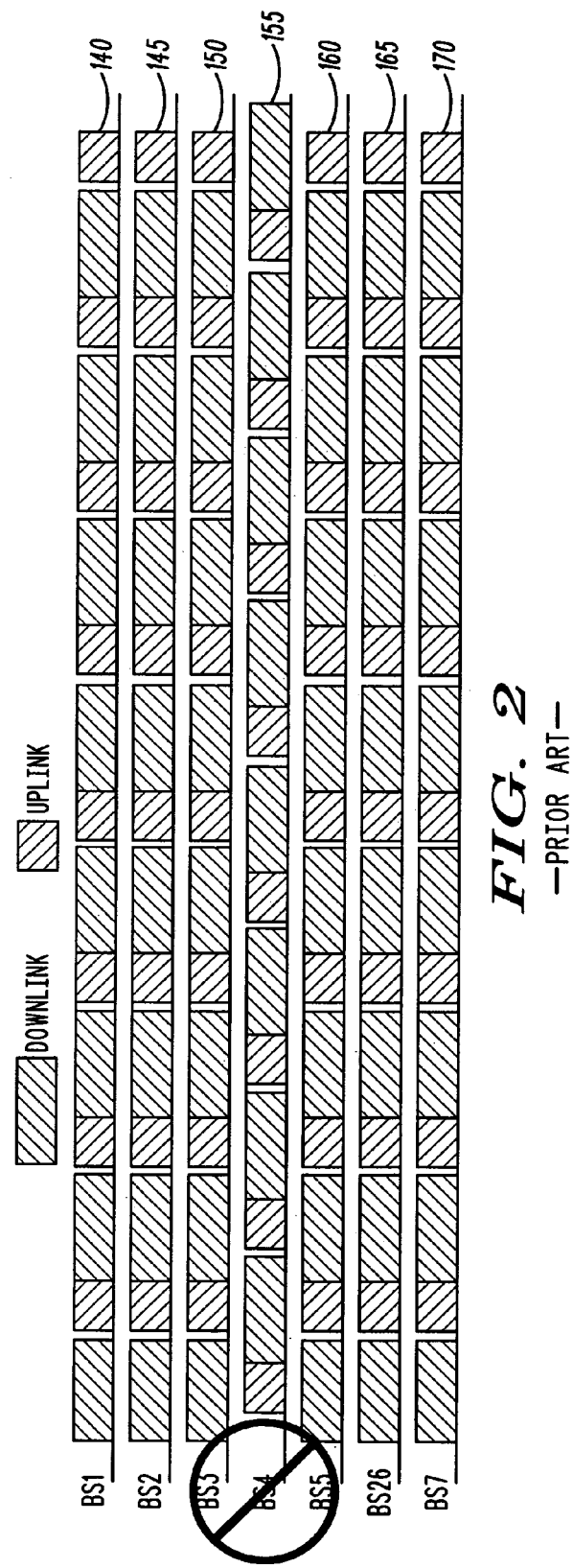
FIG. 2 —PRIOR ART—

METHOD AND APPARATUS FOR DYNAMIC ADJUSTMENT OF ORTHOGONAL FREQUENCY-DIVISION MULTIPLEXING DURING CONGESTED CONDITIONS

TECHNICAL FIELD

This invention relates generally to the handling of congestion conditions in wireless communication systems.

BACKGROUND

Cellular systems utilize a plurality of base stations to connect user terminals, such as cellular telephones, to the cellular system. Each of the user terminals initially communicates with a base station to exchange information with the system. Communications from the user terminals to a base station are called uplink ("UL") communications, and communications from the base station to the user terminals are called downlink ("DL") communications.

Current Institute of Electrical and Electronics Engineers, Inc. ("IEEE") 802.16e Worldwide Interoperability for Microwave Access ("WiMAX") and IEEE 802.16-2004 (also known as IEEE 802.16d) Orthogonal Frequency Division Multiplexing ("OFDM") fixed broadband wireless access only networks in Time Division Duplex ("TDD") mode are configured to have fixed allocations of the DL and UL portions, but nothing prevents them from being dynamically adjusted. A fixed DL and UL allocation in an OFDM system or an Orthogonal Frequency Division Multiple Access ("OFDMA") system, however, may cause some cell sites to be under-utilized while other cell sites are congested. Accordingly, system performance may become adversely affected, degrading the servicing of calls and possibly resulting in dropped calls.

The reason why fixed DL and UL allocations are utilized is due to the limitation in synchronizing DL and UL operations with other nearby cell sites. Specifically, when DL and UL transmissions are not synchronized, interference results, and system operation is adversely affected. Because DL transmissions are typically much stronger than UL transmissions, there is a strong possibility that some, or all, of the UL transmissions that occur when neighboring base stations are making DL transmissions are not properly received by the intended base stations due to this interference. As a consequence, all base stations in the same band typically must have their TDD transmit cycles synchronized. This usually occurs by allocating the fixed DL and UL ratio which may, however, cause some cell sites to be under-utilized while certain other cell sites are congested.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 1 illustrates a wireless network having several base stations according to the prior art;

FIG. 2 illustrates a chart of utilized DL and UL communication links for each of the base stations according to the prior art;

Figure 3:
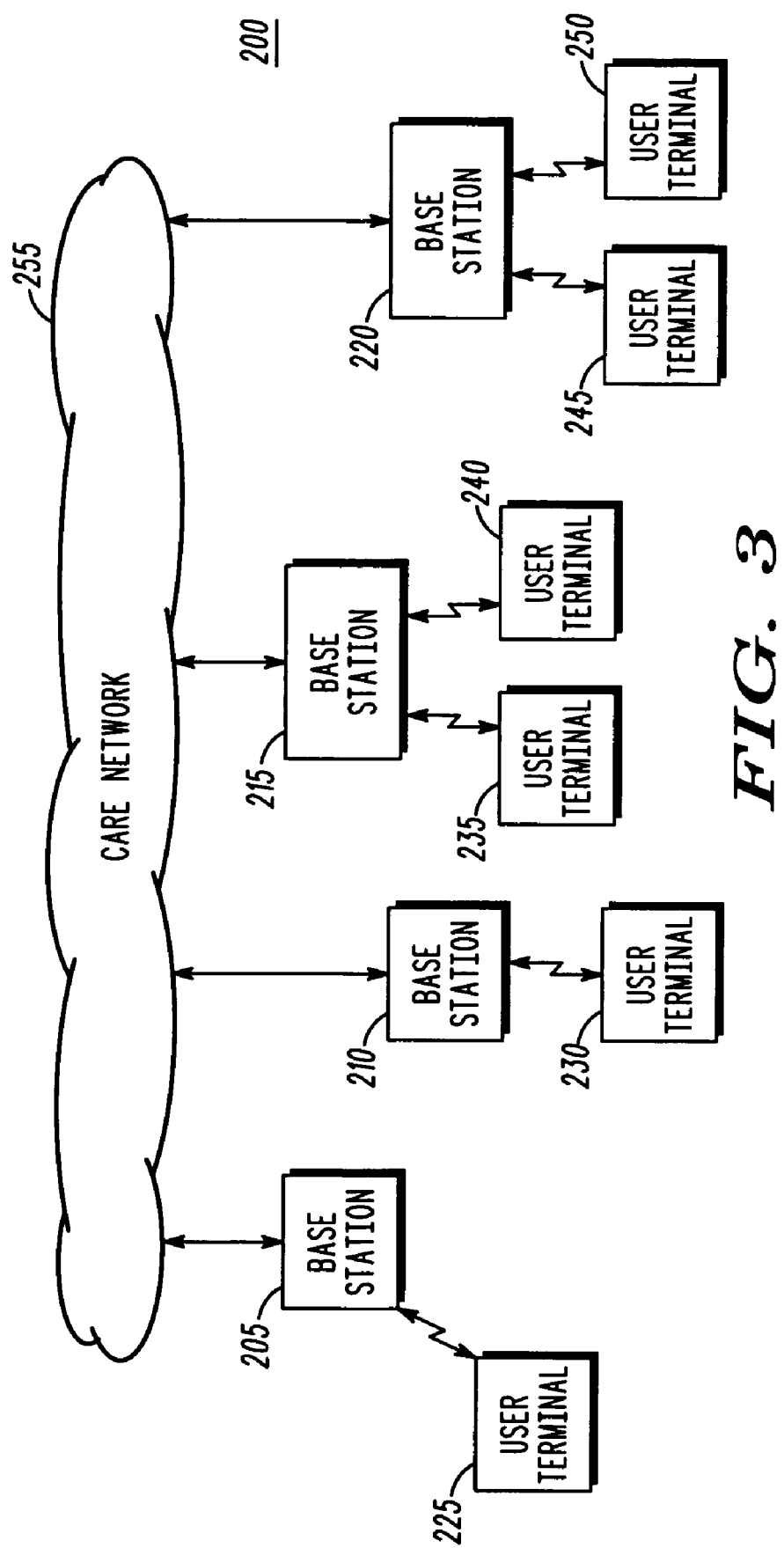
FIG. 3 illustrates a wireless system according to an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

Generally speaking, pursuant to these various embodiments, a method and system is provided for improving the performance of 802.16e Worldwide Interoperability for Microwave Access ("WiMAX") and IEEE 802.16-2004 Orthogonal Frequency Division Multiplexing ("OFDM") fixed broadband wireless access only networks in Time Division Duplex ("TDD") mode. According to an embodiment of the invention, the wireless network initially allocates an uplink ("UL") amount and a downlink ("DL") amount of a frame for transmitting data between user terminals and base stations so that, e.g., a base station transmitting in the DL direction does not interfere with a user terminal transmitting in the UL direction to a neighboring base station. In the event that a base station determines that the allocated DL amount is insufficient, e.g., the base station broadcasts or multicasts a signal to neighboring base stations requesting an expansion of its DL allocation for a specified amount of time or number of symbols or frames. The neighboring base stations determine how many extra symbols with how many subchannels and for how many frames may be allocated to the base station for transmitting on the DL by, e.g., determining whether such DL allocation expansion would adversely affect the reception of UL transmissions from user terminals to those neighboring base stations. Other base stations not in the immediate neighborhood will not be impacted or interfered with by the temporary shift of DL/UL boundary and do not need to participate in the decision. Further, these base stations may be excluded from the broadcast/multicast. Based on the signals received, the DL allocation may be increased for a specified amount of time or number of symbols, subchannels, and frames. Although an expansion of the DL allocation is described above, it should be appreciated that an expansion of the UL allocation may also be achieved by a similar method.

FIGS. 1 and 2 illustrate UL and DL usage by a set of base stations according to the prior art. As shown in FIG. 1, a wireless network includes several base stations, BS1 105, BS2 110, BS3 115, BS4 120, BS5 125, BS6 130, and BS7 135. FIG. 2 illustrates a chart of utilized DL and UL communication links for each of the base stations. As illustrated, base stations BS1 105, BS2 110, BS3 115, BS5 125, BS6 130, and BS7 135 are all transmitting DL and UL data in synchronization as indicated by transmissions 140, 145, 150, 160, 165, and 170, respectively. The transmission 155 of base station BS4 120, however, is not synchronized with those of the other base stations. Specifically, as illustrated, BS4 120 is transmitting UL data while the other base stations are transmitting DL data, and BS4 120 is transmitting DL data while the other base stations are transmitting UL data. Accordingly, crosstalk interference likely results, and system operation may be adversely affected. Because DL transmissions are typically much stronger than UL transmissions, there is a strong possibility that some, or all, of the UL transmissions that occur when neighboring base stations are making DL transmissions are not properly received by the intended base stations due to this interference. As a consequence, all base stations in the same band must have their TDD transmit cycles synchronized. This typically occurs by allocating a fixed DL to UL ratio that may, however, cause some cell sites to be under-utilized while certain other cell sites are congested.

FIG. 3 illustrates a wireless system 200 according to an embodiment of the invention. As illustrated, the wireless system 200 includes several base stations: base station 205, base station 210, base station 215, and base station 220. The base stations may each service user terminals within an associated cell area. As illustrated, base station 205 services user terminal 225, base station 210 services user terminal 230, base station 215 services user terminal 235 and user terminal 240, and base station 220 services user terminal 245 and user terminal 250. Each of the base stations is in communication with a core network 255. The core network 255 may, e.g., receive voice data from base station 205 and transmit the voice data to another base station servicing another user terminal at the final destination of a call made with user terminal 225.

The wireless system 200 may implement a WiMAX access network based on either IEEE 802.16e or the IEEE 802.16-2004 standard, operating in TDD mode. The wireless system 200 may provide a predetermined allocation of DL and UL portions of a frame. However, as discussed above, use of a fixed DL and UL allocation in OFDM/OFDMA may result in some cell sites being under-utilized while certain other cell sites are congested. To alleviate this problem, each of the base stations, such as base station 205, may implement a method of negotiating with neighboring base stations to determine whether the predetermined DL and UL allocations may be temporarily altered to more efficiently transmit data between the base stations and user terminals.

Figure 4:
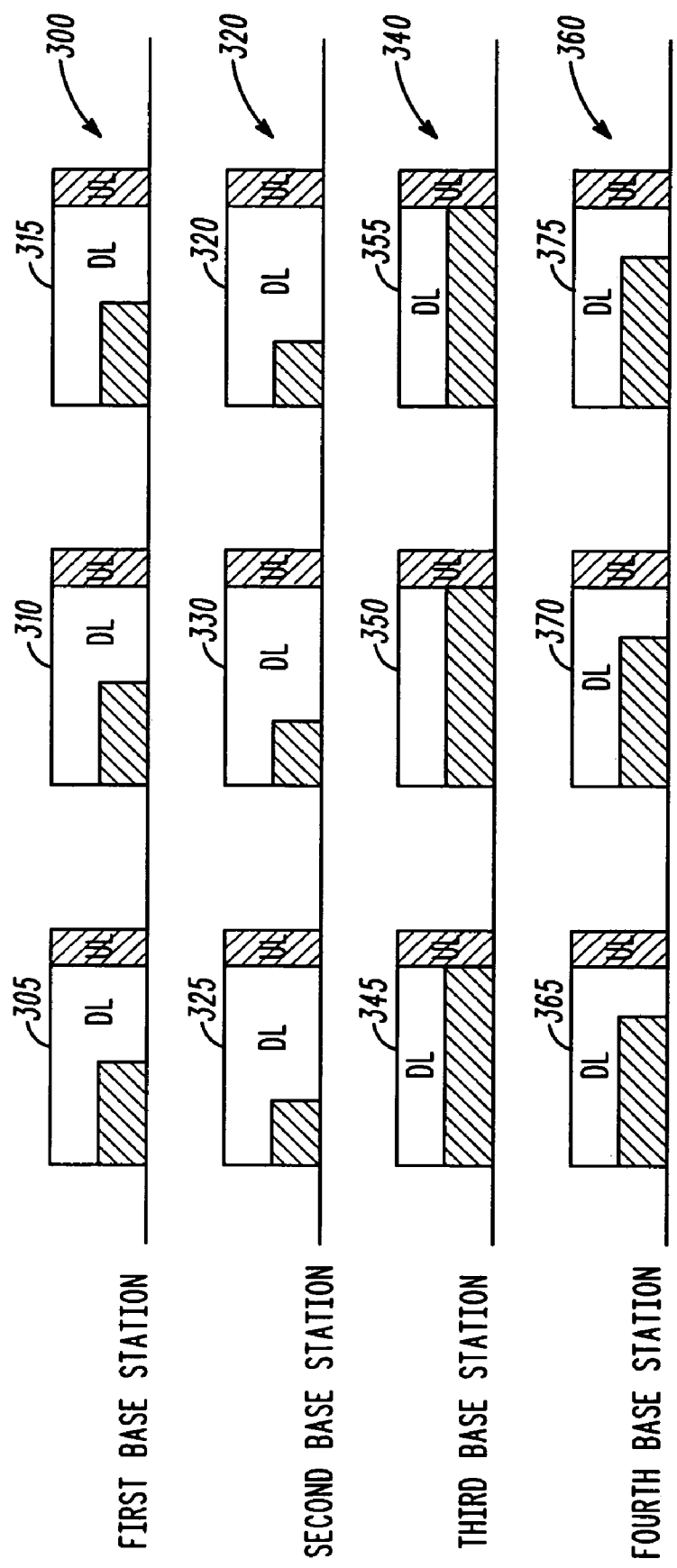
FIG. 4 illustrates UL and DL transmissions for various base stations according to an embodiment of the invention.

FIG. 4 illustrates UL and DL transmissions for various base stations according to an embodiment of the invention. As illustrated, in the data transmission 300 for the first base station 205, less than the full amount of the DL allocation is utilized. The utilized amount of the DL is shown in FIG. 4 with the boxes having the diagonal lines for illustrative purposes. As shown, about half of the DL allocation is utilized in each of the illustrated first frame 305, second frame 310, and third frame 315 for the first data transmission 300. In the illustrated data transmission 320 for the second base station 210, less than the full amount of the DL allocation is utilized as well. As shown, less than half of the DL allocation is utilized in each of the illustrated first frame 325, second frame 330, and third frame 335 for the second transmission 320. In the illustrated data transmission 340 for the third base station 215, on the other hand, the full amount of the DL allocation is utilized. As shown, the entire DL allocation is utilized in each of the illustrated first frame 345, second frame 350, and third frame 355 for the third transmission 340. In the illustrated data transmission 360 for the fourth base station 220, as with the first base station 205 and the second base station 210, less than the full amount of the DL allocation is utilized. As shown, about ⅔ of the DL allocation is utilized in each of the illustrated first frame 365, second frame 370, and third frame 375 for the fourth transmission 360.

Accordingly, because the third base station 215 is utilizing the entire allocation of its DL bandwidth, it is experiencing congestion conditions. System performance is adversely affected because the third base station 215 is unable to send data in the DL direction as quickly as it needs to in order to efficiently service user terminal 235 and user terminal 240, as shown in FIG. 3. Therefore, the third base station 215 implements a negotiation process with its neighboring base stations in an effort to temporarily expand its DL allocation relative to its UL allocation.

Figure 5:
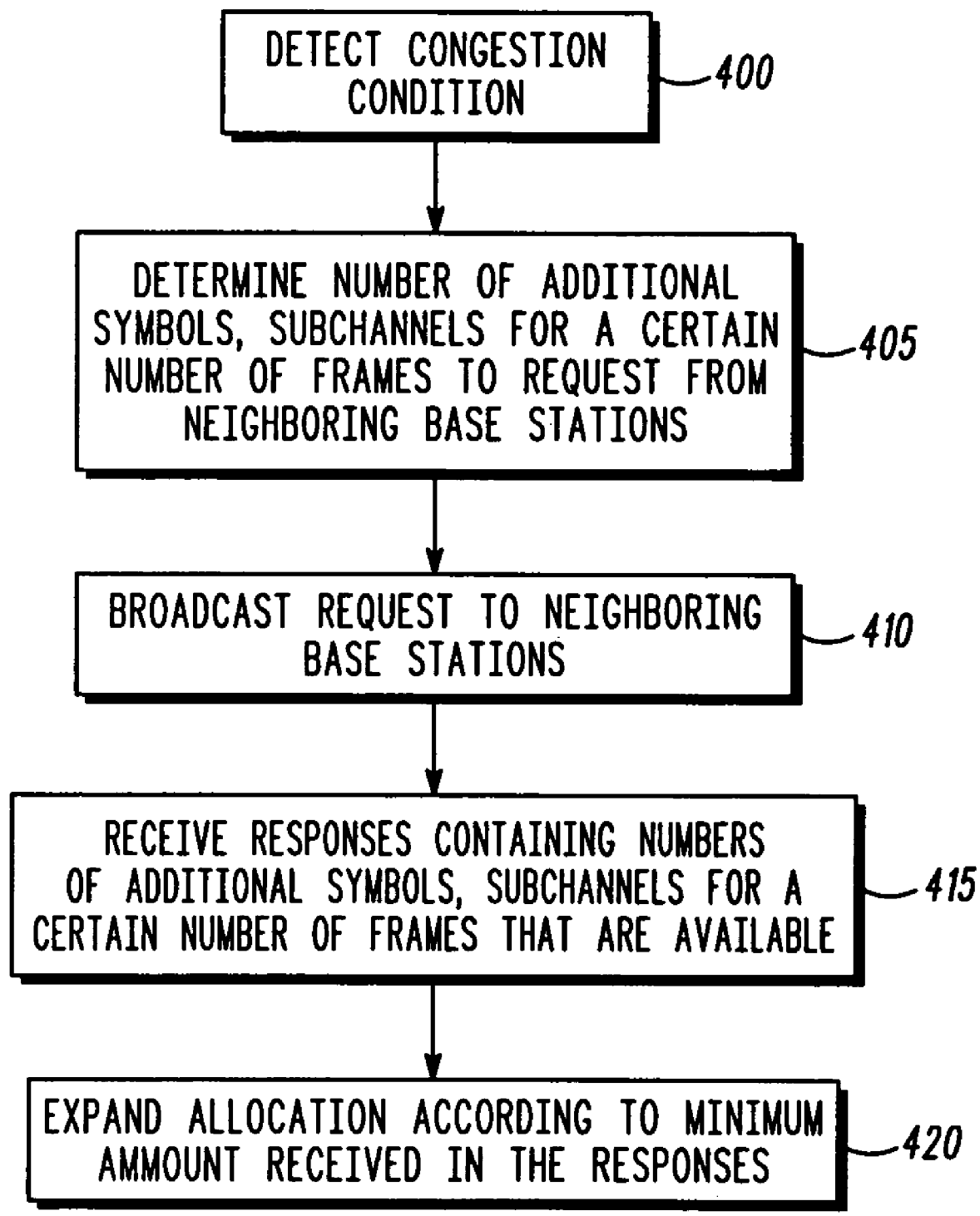
FIG. 5 illustrates a method of negotiating for a temporary shift in either a DL or UL allocation for the third base station according to an embodiment of the invention.

FIG. 5 illustrates a method of negotiating for a temporary shift in either a DL or UL allocation for the third base station 215 according to an embodiment of the invention. First, at operation 400, the third base station 215 detects a congestion condition, such as that described above with respect to FIG. 4. Next, at operation 405, the third base station 215 determines the number of additional symbols and subchannels per symbol for a certain number of frames to request from neighboring base stations, e.g., the first base station 205, the second base station 210, and the fourth base station 220. The number of additional symbols and subchannels per symbol for a certain number of frames is determined by the third base station 215 to be an amount sufficient to alleviate the congestion problem. For example, the third base station 215 may request 2 additional symbols and 3 subchannels per symbol for a total of 3 frames to alleviate its congestion conditions.

Next, at operation 410 the request is broadcast to the neighboring base stations, e.g., the first base station 205, the second base station 210, and the fourth base station 220. In the event that additional base stations are nearby, the request may also be broadcast to them as well. Each neighboring base station evaluates its own congestion condition to determine whether any symbols and subchannels for any frames may be provided to the third base station 215. For example, if the first base station 205 calculates that it will not need to use all of its UL allocation for 2 frames, then the amount of the UL allocation that will not be needed may be provided to the third base station so that the third base station can transmit additional DL data at the same time as when the first base station would normally be transmitting in the UL direction. At operation 415, the third base station 215 receives responses containing the numbers of additional symbols subchannels for a certain number of frames that are available from each of its neighboring base stations, e.g., the first base station 205, the second base station 210, and the fourth base station 220. Next, the third base station 215 determines the smallest additional amount in the responses and then expands its DL allocation accordingly at operation 420. The third base station 215 subsequently informs the neighboring base stations the amount of number of symbols, number of subchannels, and number of frames for which the frame boundary will be increased so that each neighboring base station will temporarily suspend its UL (or DL) operation for the number of symbols in those suspended number of subchannels or the number of frames. For example, the DL allocation may be increased by 3 symbols with 2 subchannels for 4 frames. After the specified number of frames, each of the base stations reverts back to its original boundary allocations.

Although the method shown in FIG. 5 is described with respect to an expansion of the DL allocation, it should be appreciated that an expansion of the UL allocation may also be requested and implemented, depending on system conditions.

In the event that any one of the neighboring base stations is unable to give up any symbols and subchannels for any frames, then the third base station will not increase its DL allocation even if all of the other neighboring base stations have available allocations to give, because interference would result with the other base station that cannot give up any of its allocation.

Figure 6:
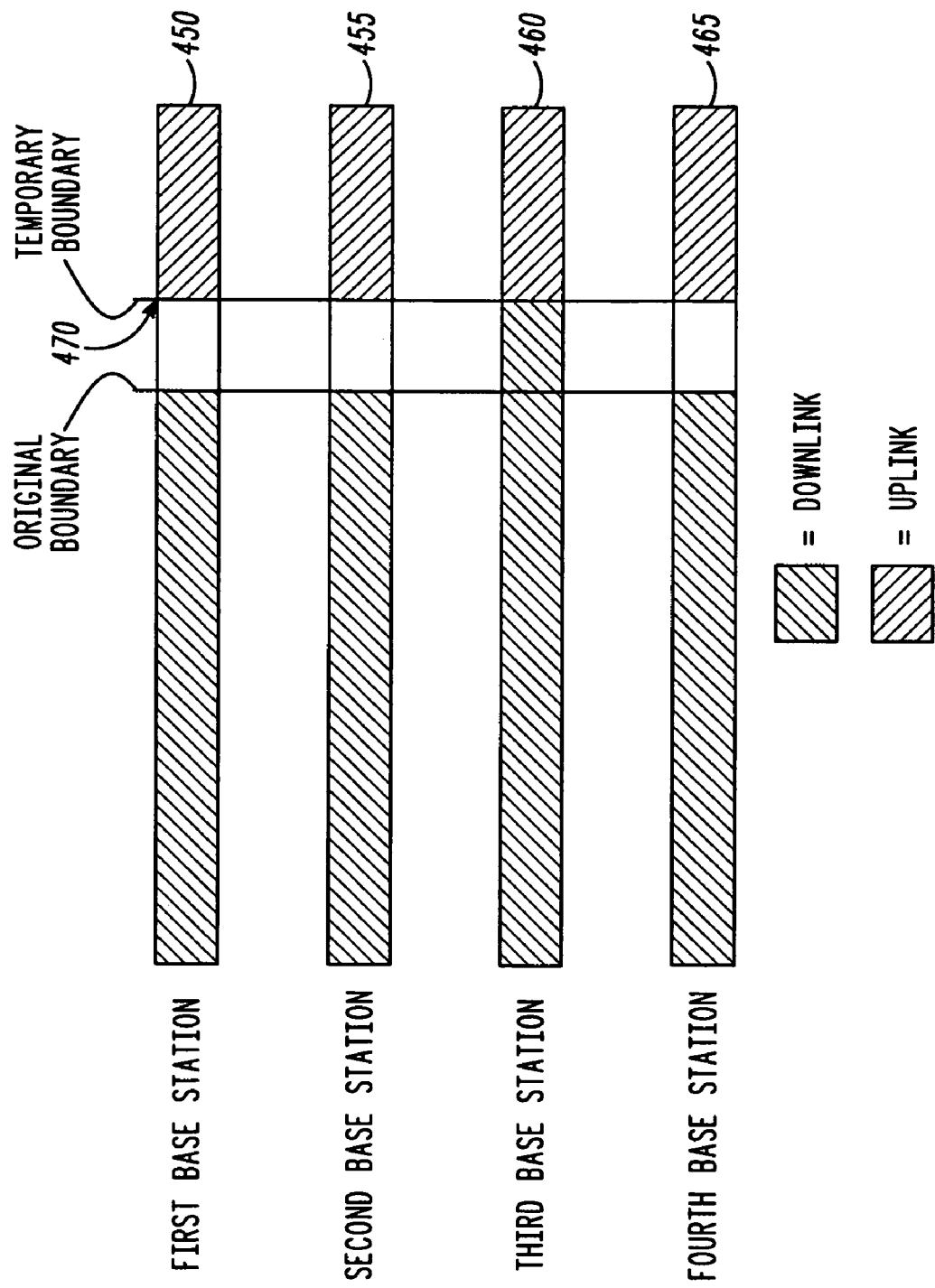
FIG. 6 illustrates negotiated DL and UL transmissions for base stations according to an embodiment of the invention.

FIG. 6 illustrates negotiated DL and UL transmissions for base stations according to an embodiment of the invention. As shown, a first transmission 450 for the first base station 205 includes a DL portion followed by a UL portion. A second transmission 455 for the second base station 210 also includes a DL followed by a UL portion, as does a third transmission 460 for the third base station 215, and a fourth transmission 465 for the fourth base station 220. The boundary between the DL and UL portions is initially set at a point about ⅔ of the way through each transmission, as illustrated. However, after the negotiation method described above, the boundary is temporarily shifted to allow more time for the DL transmission, as shown in the third transmission 460. In some embodiments the first transmission 455, the second transmission 455, and the fourth transmission 465 do not transmit either a UL or a DL portion during this time interval between the original boundary and the temporary boundary. In other embodiments, however, the DL portions for the first transmission 455, the second transmission 455, and the fourth transmission 465, respectively, may be transmitted. The boundary may be shifted by, e.g., 2 symbols having 2 subchannels, as shown by reference number 470.

Figure 7:
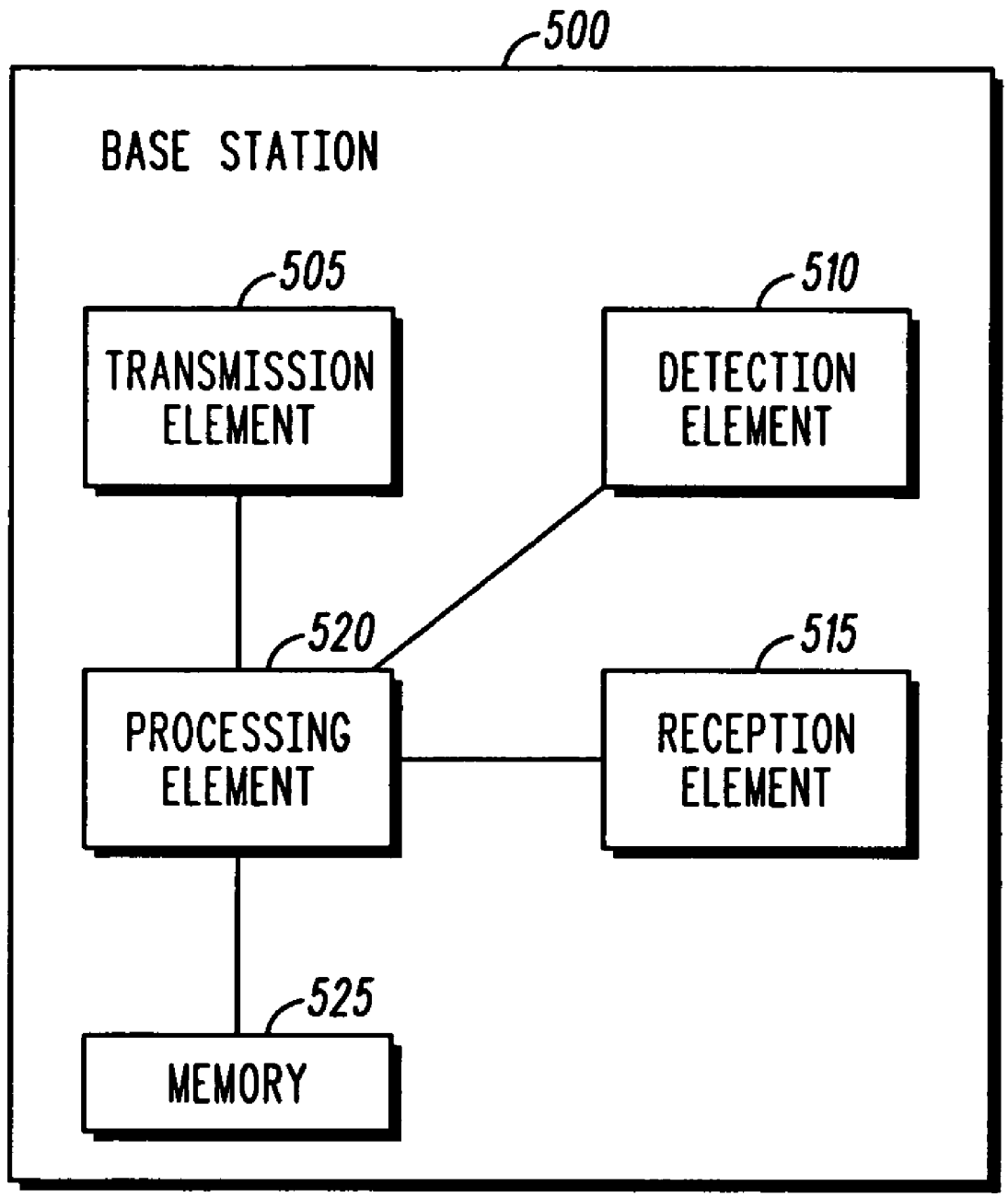
FIG. 7 illustrates a base station according to an embodiment of the invention.

FIG. 7 illustrates a base station 500 according to an embodiment of the invention. The base station includes a transmission element 505 to wirelessly transmit data frames. The data frames have a predetermined uplink allocation and a predetermined downlink allocation, as discussed above. A detection element 510 detects a congestion condition. A congestion condition may be detected by one or more indicators. Common examples of such indicators may include observing the queue size and/or the delay of various classes of traffic categories. In response to the congestion condition being detected, the transmission element 505 transmits a request to neighboring base stations for an expansion of one of the predetermined uplink allocation and the predetermined downlink allocation, as discussed above with respect to FIG. 5. A reception element 515 receives a signal from the neighboring base stations. A processing element 520 expands either the predetermined uplink allocation or the predetermined downlink allocation by a specified amount in response to the signal indicating the specified amount. A memory 525 is utilized to store the specified amount. The processing element 520 is in communication with each of the transmission element 505, the detection element 510, the reception element 515 and the memory 525.

Pursuant to these teachings, a method and system is provided for improving the performance of Worldwide Interoperability for Microwave Access ("WiMAX") networks, based on IEEE 802.16e or the IEEE 802.16-2004 standard, operating in Time Division Duplex ("TDD") mode. The wireless network initially allocates a UL amount and a DL amount of a frame for transmitting data between user terminals and base stations so that, e.g., a base station transmitting in the DL direction does not interfere with a user terminal transmitting in the UL direction to a neighboring base station. In the event that a base station determines that the allocated DL amount is insufficient, e.g., the base station broadcasts a signal to neighboring base stations requesting an expansion of its DL allocation for a specified amount of time or number of symbols or frames. The neighboring base stations determine how many extra symbols with how many subchannels and for how many frames may be allocated to the base station for transmitting on the DL by, e.g., determining whether such DL allocation expansion would adversely affect the reception of UL transmissions from user terminals to those neighboring base stations. Based on the signals received, the DL allocation may be increased for a specified amount of time or number of symbols, subchannels, and frames.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method performs by a base station, the method comprising:
    wirelessly transmitting at least one data frame, the at least one data frame having a predetermined uplink allocation and a predetermined downlink allocation;
    detecting a congestion condition in at least one of an uplink direction and a downlink direction;
    transmitting a request to at least one neighboring base station for an expansion of one of the predetermined uplink allocation and the predetermined downlink allocation;
    receiving at least one signal from the at least one neighboring base station; and
    expanding the one of the predetermined uplink allocation and the predetermined downlink allocation by a specified amount in response to the at least one signal indicating the specified amount.

2. The method of claim 1, wherein in response to the predetermined uplink allocation being expanded by the specified amount, the predetermined downlink allocation is decreased by the specified amount, or further wherein in response to the predetermined downlink allocation being expanded by the specified amount, the predetermined uplink allocation is decreased by the specified amount.

3. The method of claim 1, wherein the at least one data frame is comprised of symbols and subchannels.

4. The method of claim 3, wherein the specified amount comprises at least one of a first amount of the at least one data frame, a second amount of the symbols, and a third amount of the subchannels.

5. The method of claim 3, wherein the symbols are selected from a group consisting of Orthogonal Frequency Division Multiplexing ("OFDM") symbols and Orthogonal Frequency Division Multiple Access ("OFDMA") symbols and subchannels.

6. The method of claim 1, wherein the wirelessly transmitting comprises wirelessly transmitting the at least one data frame using a Worldwide Interoperability for Microwave Access ("WiMAX") network.

7. The method of claim 1, wherein the specified amount is NULL.

8. The method of claim 1, wherein the at least one neighboring base station comprises all neighboring base stations.

9. A system, comprising:
    a base station being configured and arranged to wirelessly transmit at least one data frame, the at least one data frame having a predetermined uplink allocation and a predetermined downlink allocation, wherein the base station further comprises:
    a congestion condition detector;
    an expansion request transmitter that is responsive to the congestion condition detector;
    a memory having stored therein a specified amount received from at least one neighboring base station by which one of the predetermined uplink allocation and the predetermined downlink allocation is to be expanded; and at least one neighboring base station that is configured and arranged to receive an expansion request from the base station and transmit a signal indicating the specified amount by which the one of the predetermined uplink allocation and the predetermined downlink allocation is to be expanded.

10. The system according to claim 9, wherein the at least one data frame is comprised of symbols and subchannels.

11. The system according to claim 10, wherein the specified amount comprises at least one of a first amount of the at least one data frame, a second amount of the symbols, and a third amount of the subchannels.

12. The system of claim 9, wherein the base station and the at least one neighboring base station comprise a Worldwide Interoperability for Microwave Access ("WiMAX") network.

13. The system of claim 9, wherein the system is a Time Division Duplex wireless access system.

14. A base station, comprising:

a transmission element to wirelessly transmit at least one data frame, the at least one data frame having a predetermined uplink allocation and a predetermined downlink allocation;

a detection element to detect a congestion condition, wherein in response to the congestion condition being detected, the transmission element transmits a request to at least one neighboring base station for an expansion of one of the predetermined uplink allocation and the predetermined downlink allocation;

a reception element to receive a signal from the at least one neighboring base station; and a processing element to expand the one of the predetermined uplink allocation and the predetermined downlink allocation by a specified amount in response to the signal indicating the specified amount.

15. The base station of claim 14, wherein in response to the processing element expanding the predetermined uplink allocation by the specified amount, the predetermined downlink allocation is decreased by the specified amount, or further wherein in response to the processing element expanding the predetermined downlink allocation by the specified amount, the predetermined uplink allocation is decreased by the specified amount.

16. The base station of claim 14, wherein the at least one data frame wirelessly transmitted by the transmission element is comprised of symbols and subchannels.

17. The base station of claim 16, wherein the specified amount comprises a first amount of the at least one data frame, a second amount of the symbols, and a third amount of the subchannels.

18. The base station of claim 14, wherein the wirelessly transmitting of the at least one data frame by the transmission element comprises wirelessly transmitting the at least one data frame using a Worldwide Interoperability for Microwave Access ("WiMAX") network.

19. The base station of claim 14, wherein the at least one neighboring base station comprises all neighboring base stations.

* * * * *